United States Patent
Zhu et al.

(10) Patent No.: US 8,551,634 B2
(45) Date of Patent: Oct. 8, 2013

(54) COMPUTER ENCLOSURE WITH BATTERY HOLDING STRUCTURE

(75) Inventors: Wei-Wei Zhu, Shenzhen (CN);
Chun-Bao Gu, Shenzhen (CN);
Meng-Ping Xu, Shenzhen (CN);
Wen-Hsiang Hung, Tu-Cheng (TW)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 354 days.

(21) Appl. No.: 13/015,548

(22) Filed: Jan. 27, 2011

(65) Prior Publication Data
US 2012/0148893 A1 Jun. 14, 2012

(30) Foreign Application Priority Data
Dec. 9, 2010 (CN) .......................... 2010 1 0581103

(51) Int. Cl.
*H01M 2/10* (2006.01)
*H05K 7/00* (2006.01)

(52) U.S. Cl.
USPC .... 429/97; 429/100; 361/679.55; 361/679.58

(58) Field of Classification Search
USPC .................. 429/97, 100; 361/679.55, 679.58
See application file for complete search history.

(56) References Cited

U.S. PATENT DOCUMENTS

| 5,130,892 | A * | 7/1992 | Satou ........................ 361/679.55 |
| 8,252,445 | B2 * | 8/2012 | Chu .............................. 429/100 |
| 8,283,065 | B2 * | 10/2012 | Zhang .............................. 429/97 |
| 8,361,643 | B2 * | 1/2013 | Ng ................................... 429/97 |
| 8,379,385 | B2 * | 2/2013 | Miyagi et al. ............. 361/679.58 |
| 2005/0225933 | A1 * | 10/2005 | Kang et al. .................... 361/679 |
| 2008/0268329 | A1 * | 10/2008 | Mackle et al. .................. 429/97 |

* cited by examiner

*Primary Examiner* — Stephen J. Kalafut
(74) *Attorney, Agent, or Firm* — Altis & Wispro Law Group, Inc.

(57) ABSTRACT

A computer enclosure includes a frame portion and a battery holding structure. The frame portion defines a battery receiving groove for receiving a battery, a first sliding groove and a second sliding groove communicating with the battery receiving groove. The battery holding structure includes a first locking member movably received in the first sliding groove, a second locking member movably received in the second sliding groove, and a spring. The first locking member includes a first latching block. The second locking member includes a second latching block. The spring is compressed between the second locking member and an inner surface of the second sliding groove and configured to provide a force to push the second latching block into the battery receiving groove. The first and second latching members can be pushed into the battery receiving groove to cooperatively latch the battery in the battery receiving groove.

19 Claims, 7 Drawing Sheets

COMPUTER ENCLOSURE WITH BATTERY HOLDING STRUCTURE

BACKGROUND

1. Technical Field

The present disclosure relates to a computer enclosure with battery holding structure.

2. Description of Related Art

Portable computers, or all-in-one (AIO) computers, are often powered by batteries. A typical portable computer or AIO computer includes a battery holding structure for holding a battery. When the typical portable computer or AIO computer does not need to be powered by the battery or the battery needs to be charged, the battery could be detached from the battery holding structure. However, the battery holding structure is unreliable and cannot hold the battery firmly.

Therefore, it is desirable to provide a computer enclosure with a battery holding structure which can overcome the above-mentioned problems.

BRIEF DESCRIPTION OF THE FIGURE

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
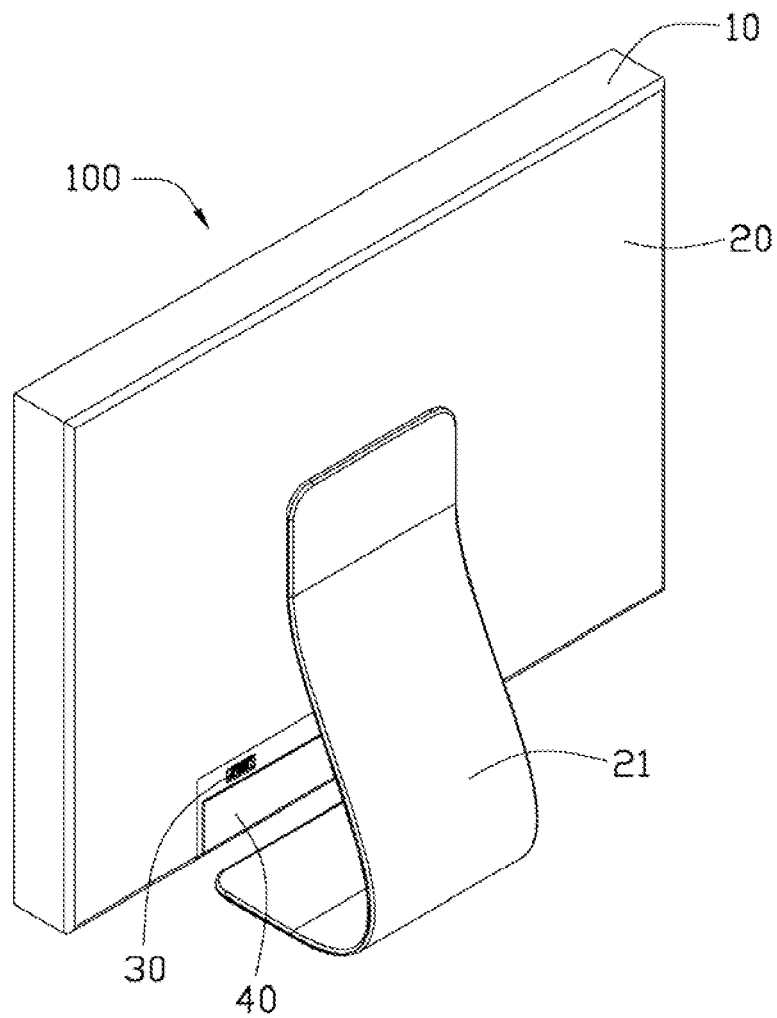
FIG. 1 is an isometric, assembled view of a computer enclosure with a battery holding structure according to one embodiment.
Figure 2:
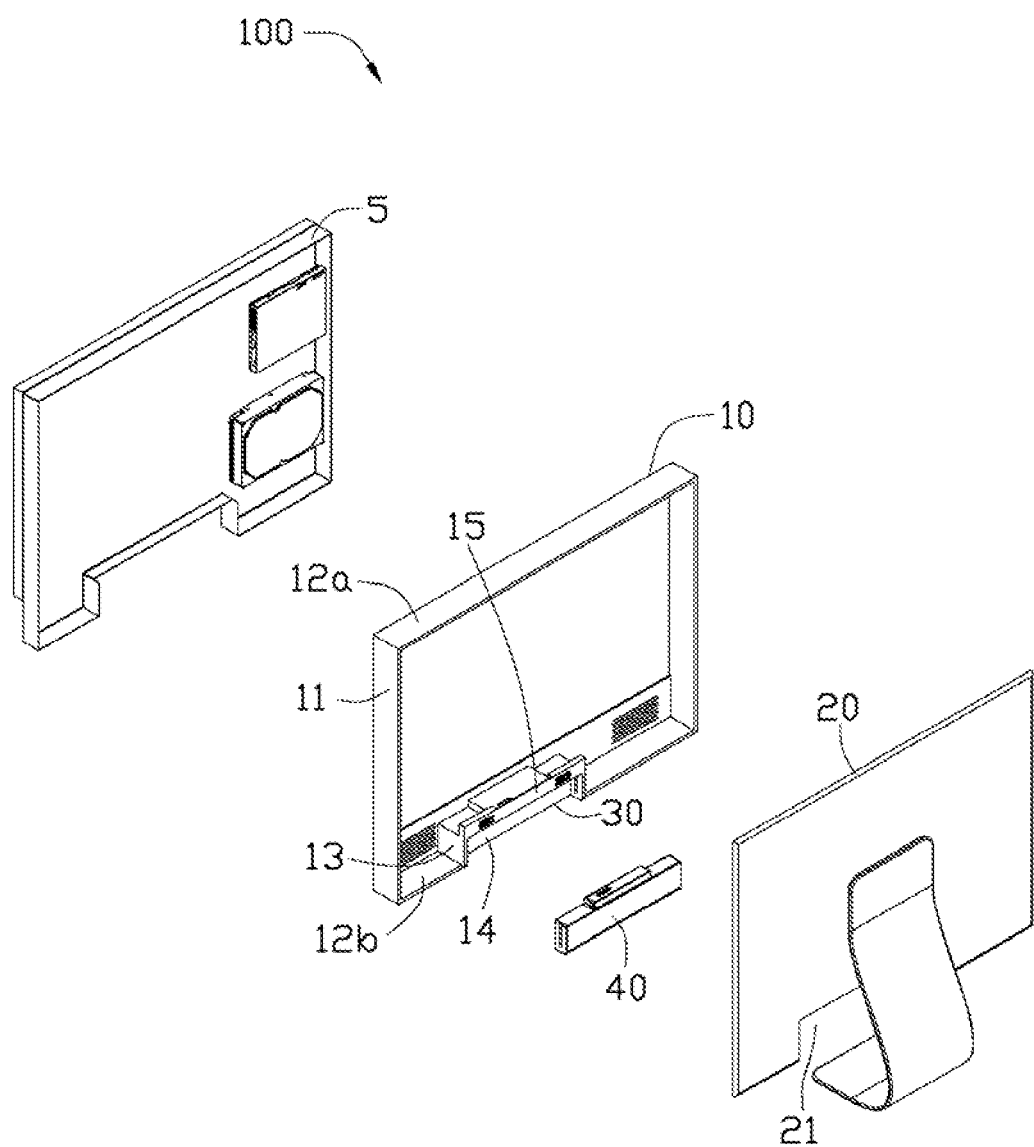
FIG. 2 is an isometric, exploded view of the computer enclosure of FIG. 1.

Referring to FIGS. 1 and 2, a computer enclosure 100, according to one embodiment, includes a front cover 5, a frame portion 10, and a rear cover 20. In the illustrated embodiment, the computer enclosure 100 is used for an AIO computer. The front cover 5 and the rear cover 20 are detachably connected to two opposite sides of the frame portion 10. The frame portion 10 includes a battery holding structure 30 for holding a battery 40. The rear cover 20 defines an opening 21 corresponding to the battery holding structure 30 and the battery 40, thereby the battery holding structure 30 and the battery 40 can be exposed out of the rear cover 20 through the opening 21.

Figure 3:
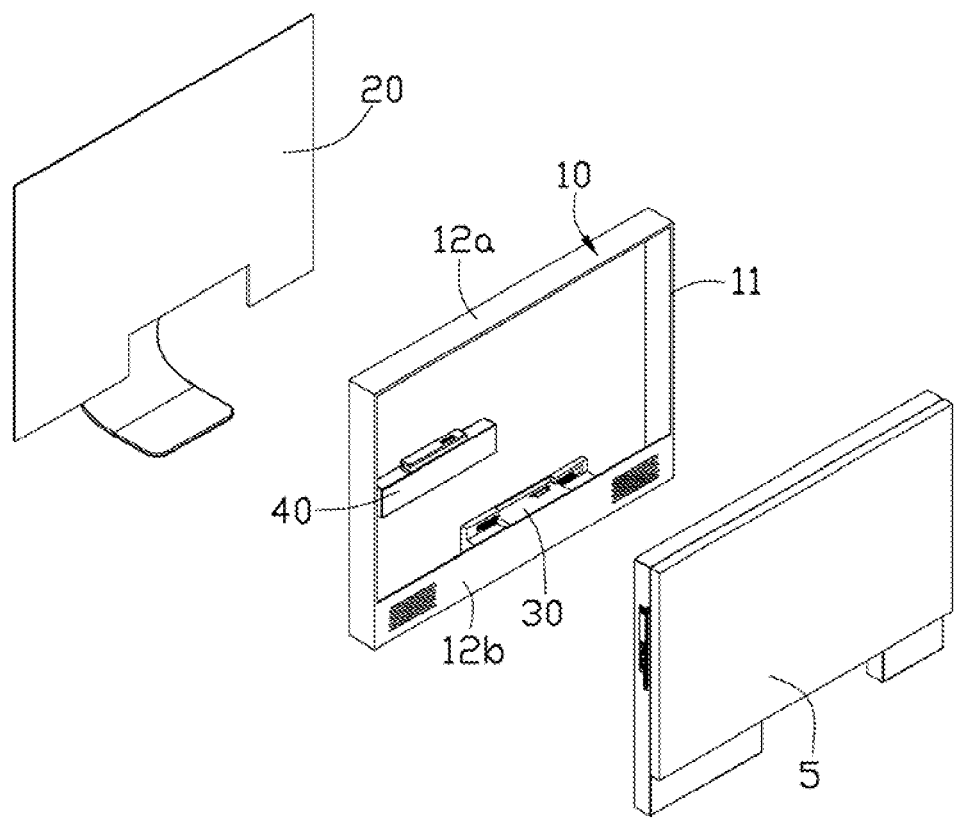
FIG. 3 is similar to FIG. 2, but viewed from another angle.
Figure 4:
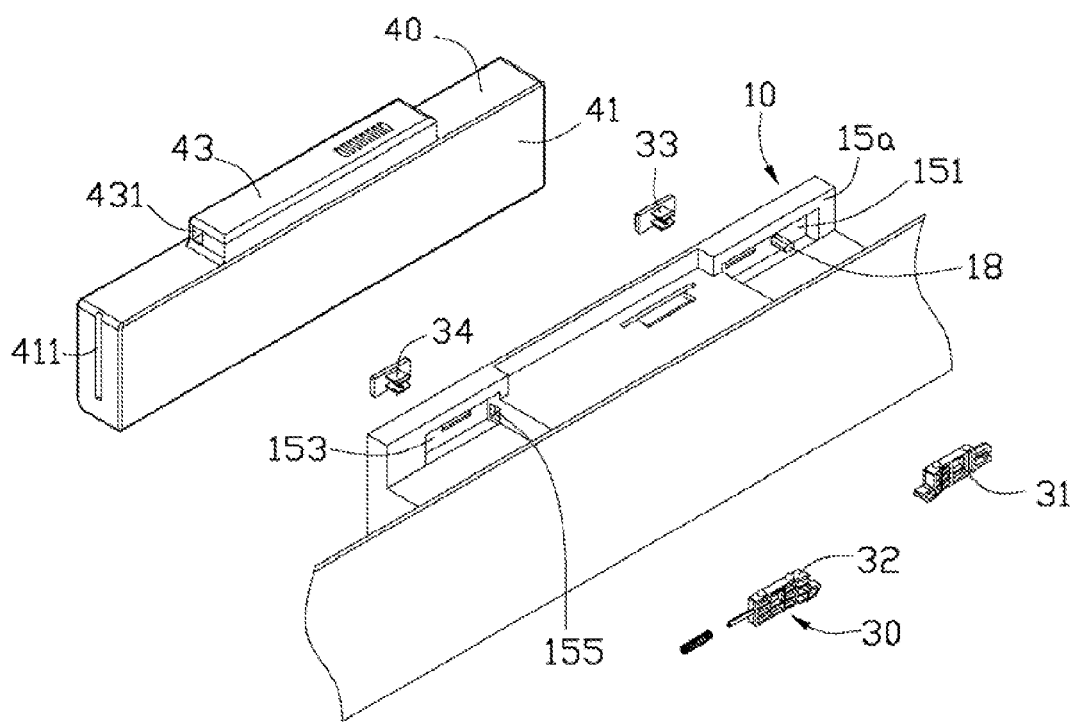
FIG. 4 is an enlarged, exploded view of the battery holding structure and a battery of FIG. 1.
Figure 5:
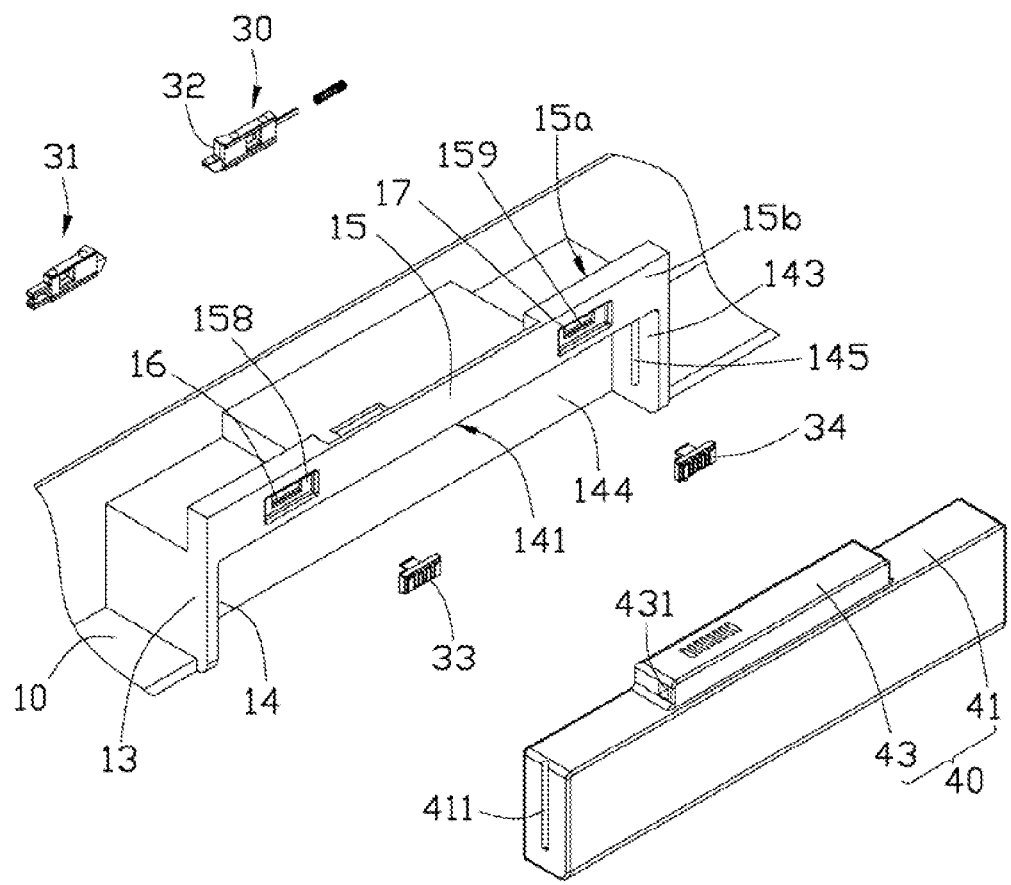
FIG. 5 is similar to FIG. 4, but viewed from another angle.

Referring to FIGS. 3-5, the frame portion 10 includes two sidewalls 11, a top wall 12a, and a bottom wall 12b opposite to the top wall 12a. The sidewalls 11, the topwall 12a, and the bottom wall 12b connect to each other end to end, and then cooperatively form a substantially rectangular frame. A sub-frame 13 extends from an inner surface of the bottom wall 12b towards the top wall 12a. The sub-frame 13 defines a battery receiving groove 14 for receiving a battery 40. The battery receiving groove 14 includes an upper surface 141, two opposite side surfaces 143, and a front surface 144 interconnecting the upper surface 141 to the side surfaces 143. The side surfaces 143 oppositely extend two strip protrusions 145 each substantially parallel to the front wall 144.

A rectangle flange portion 15 is extended upward from a top surface of the sub-frame 13. The flange portion 15 includes a first surface 15a opposing the front cover 5, and a second surface 15b opposing the inside of the rear cover 20.

The first surface 15a defines a first sliding groove 151 and a second sliding groove 153 both extending towards the second surface 15b. In the present embodiment, the first sliding groove 151 and the second sliding groove 153 are both rectangular, and symmetrical about the central axis of the flange portion 15. A latching hole 155 is defined in each of an inside surface of the first sliding groove 151 and the inside surface of the second sliding groove 153. The two latching holes 155 are adjacent to each other and communicate with the battery receiving groove 14. Two opposite first slots (not shown) are correspondingly defined in the first sliding groove 151, with each located on a top surface and a bottom surface opposite to the top surface of the first sliding groove 151. Similarly, a top surface and an opposite bottom surface of the second sliding groove 153 correspondingly defines two second slots (not shown). A positioning bar 18 protrudes in the first sliding groove 151, along an extending direction of the first sliding groove 151.

The second surface 15b defines a third sliding groove 158 corresponding to the first sliding groove 151, and a fourth sliding groove 159 corresponding to the second sliding groove 153. The third sliding groove 158 communicates with the first sliding groove 151 through a first through hole 16, and the fourth sliding groove 159 communicates with the fourth sliding groove 159 through a second through hole 17.

Figure 6:
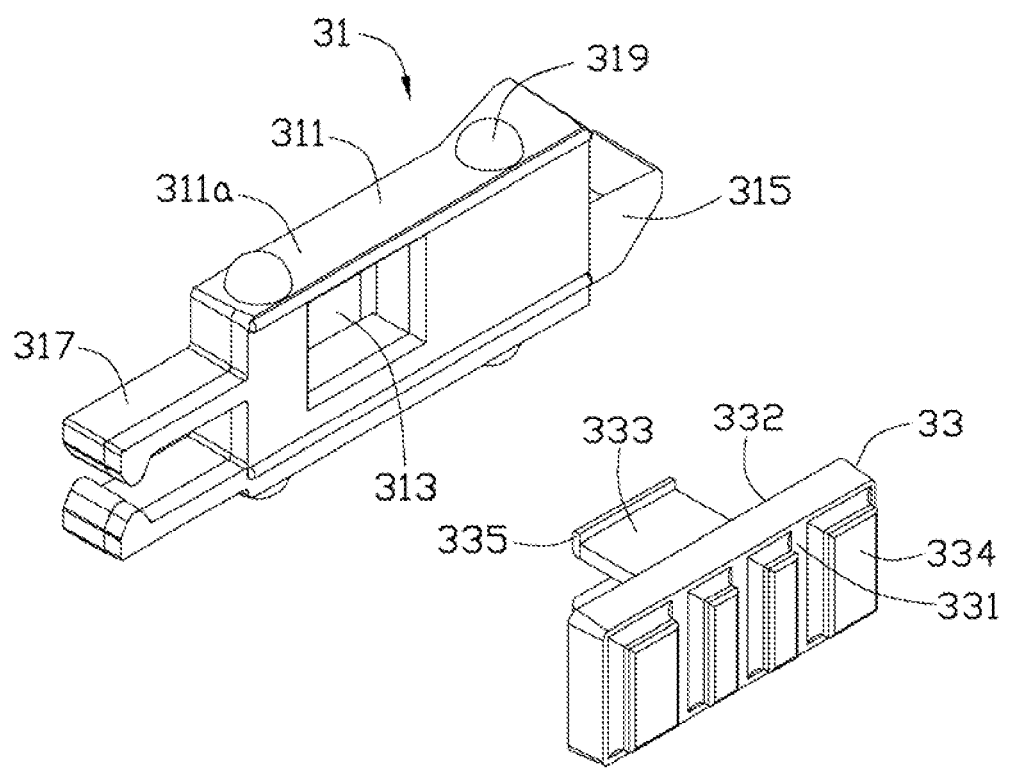
FIG. 6 is an enlarged, partially exploded view of a first locking member and an operation member of the battery holding structure of FIG. 4.
Figure 7:
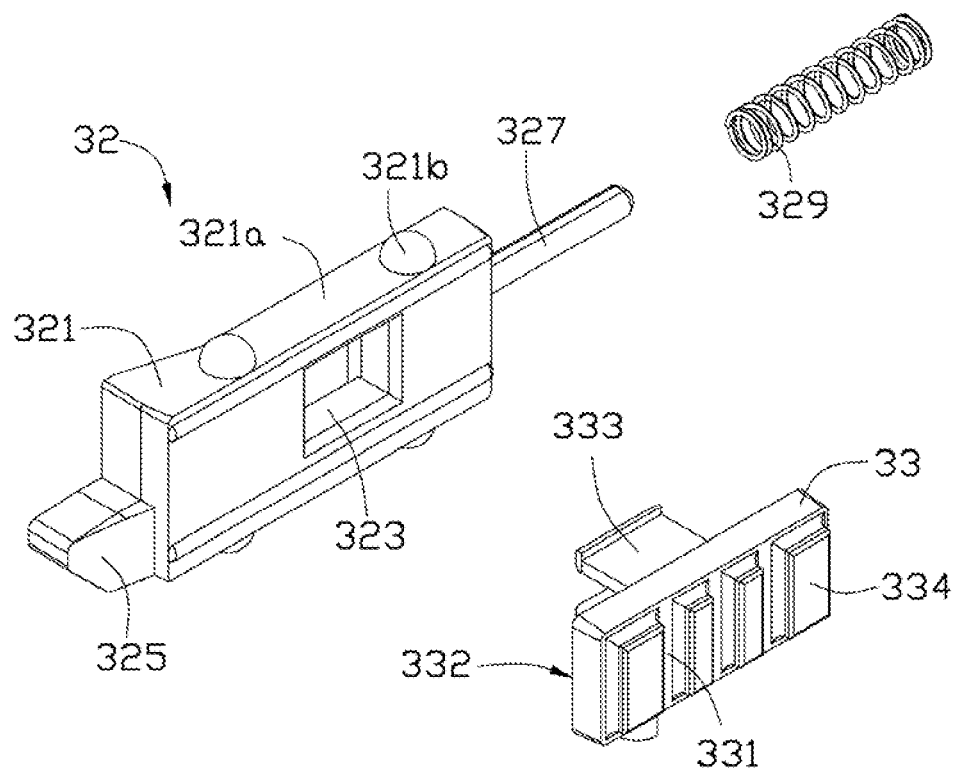
FIG. 7 is an enlarged, partially exploded view of a second locking member and another operation member of the battery holding structure of FIG. 4.

Referring to FIGS. 6-7, the battery holding structure 30 includes a first locking member 31, a second locking member 32, and two operation members 33. The first locking member 31 is received in the first sliding groove 151. The second locking member 32 is received in the second sliding groove 153. The operation members 33 are received in the third, fourth sliding grooves 158, 159 correspondingly, and configured to push the first locking member 31 and the second locking member 32 to slide in the first sliding groove 151 and the second sliding groove 153.

In detail, the first locking member 31 includes a first main body 311, a first locking groove 313 defined through the first main body 311, and a first latching block 315 extending from an end of the first main body 311, two elastic clamping arms 317 extending from another end of the first main body 311 opposite to the first latching block 315. In this embodiment, the first main body 311 is shaped as a rectangular plane. The first main body 311 includes two opposite first lateral sidewalls 311a each extending two circular first protrusions 319 thereon. The first latching block 315 is wedge-shaped. The two elastic clamping arms 317 substantially form a U-shaped configuration and can be elastically stretched away from each other.

The second locking member 32 includes a second main body 321, a second locking groove 323 defined through the second main body 321, a second latching block 325 extending from an end of the second main body 321, a guiding bar 327 extending from another end of the second main body 321 opposite to the second latching block 325, and a coil spring 329. The coil spring 329 is tightly coiled around the guiding bar 327. The coil spring 329 can be resisted between the second main body 321 and the inner surface of the second sliding groove 153. A flexible force of the coil spring 329 can drive the second latching block 325 to be received in the latching hole 155 of the second sliding groove 153. In this embodiment, the natural length of the coil spring 329 is larger than the length of the guiding bar 327, so that the second locking member 32 can be slidable within the second sliding groove 153. In this embodiment, the second main body 321 is shaped as a rectangular plane. The second main body 321 includes two opposite second lateral sidewalls 321a each extending two circular second protrusions 321b thereon. The second latching block 325 is wedge-shaped.

Each operation member 33 includes an operation panel 331, a mounting panel 332 opposite to the operation panel 331 and two spaced elastic feet portions 333 perpendicularly protruding from the middle of the mounting panel 332. The operation panel 331 extends a number of rectangular protrusions 334 thereon for convenient operation. Each feet portion 333 has a locking end portion 335 formed at the distal end thereof. The locking end portion 335 extends along a direction parallel to the mounting panel 332. The third, fourth sliding grooves 158, 159 are longer than the operation members 33, thereby the operation members 33 can be slidable within the third, fourth sliding grooves 158, 159 correspondingly.

Referring back to FIGS. 4 and 5, the battery 40 includes a rectangular battery body 41 and a protruding portion 43 extending upward from an upper surface of the battery body 41. Two opposite parallel sidewalls of the battery body 41 respectively define a receiving slot 411 for receiving the strip protrusion 145 of the sub-frame 13. Two opposite sidewalls of the protruding portion 43 respectively define a security hole 431 corresponding to the first latching block 315 or the second latching block 325. The shape of the battery receiving groove 14 corresponds to that of the battery 40.

In assembly, the first main body 311 is received in the first sliding groove 151, while the first circular protrusions 319 of the first locking member 31 are correspondingly received in the first slots of the first sliding groove 151. The first slot limits the vertical movement of the first locking member 31 in the first sliding groove 151. The first latching block 315 latches with the latching hole 155 in the first sliding groove 151 and partly exposed out of the battery receiving groove 14 through the latching hole 155. The clamping arms 317 clamp on the positioning bar 18. Similarly, the second main body 321 is received in the second sliding groove 153, and the second protrusions 321b are correspondingly received in the second slots of the second sliding groove 153. The second latching block 325 latches with the latching hole 155 of the second sliding groove 153 and partly exposed out of the battery receiving groove 14 through the latching hole 155. The guiding bar 327 engages in the second sliding groove 153 and the coil spring 329 is resisted between the second main body 321 and the inner surface of the second sliding groove 153.

One of the operation members 33 is set on the third sliding groove 158. The feet portions 333 of the operation member 33 are both received in the first locking groove 313 of the first locking member 31, through the first through hole 16. Another operation member 33 is set on the fourth sliding groove 159, the feet portions 333 of the another operation member 33 are both received in the second locking groove 323 of the second locking member 32 through the second through hole 17. As such, the first locking member 31 and the second locking member 32 can lock the two operation members 33 in the third, fourth sliding grooves 158, 159 correspondingly. Therefore, the operation member 33 engaging with the first locking member 31 is movable relative to the third sliding groove 158 by an external force, the first locking member 31 may be moved relative to the first sliding groove 151. Similarly, the operation member 33 engaging with the second locking member 32 is movable relative to the fourth groove 159, and the second locking member 32 is movable relative to the second sliding groove 153.

When the battery 40 is needed to be installed in the battery receiving groove 14, the operation member 33 engaging with the second locking member 32 is manually pushed away from the battery receiving groove 14. As a result, the operation member 33 may slide the second locking member 32 relative to the second sliding groove 153 and the fourth sliding groove 159. Thus, the second latching block 325 of the second locking member 32 returns to the second sliding groove 153 from the battery receiving groove 14. The pressure is kept until the battery 40 is mounted to the battery receiving groove 14. Then the first latching block 315 of the first locking member 31 can be received in the security hole 431. Sequentially, the operation member 33 engaging with the second locking member 32 is released, the second locking member 32 can slide back to the original position, then the second latching block 325 of the second locking member 32 can engage into the other security hole 431. As such, the battery 40 is locked in the battery receiving groove 14 by the first locking member 31 and the second locking member 32.

To detach the battery 40 from the computer enclosure 100, the operation member 33 engaging with the second locking member 32 is manually pushed away from the battery receiving groove 14 until the second latching block 325 of the second locking member 32 is released from the security hole 431. As such, the battery 40 can be easily removed from the battery receiving groove 14 by manually drawing the first latching block 315 of the first locking member 31 from the other security hole 431.

While various exemplary have been described, it is to be understood that the disclosure is not limited thereto. To the contrary, various modifications and similar arrangements (as would be apparent to those skilled in the art) are intended to be covered. Therefore, the scope of the appended claims should be accorded the broadest interpretation so as to encompass all such modifications and similar arrangements.

What is claimed is:

1. A computer enclosure, comprising:
   a frame portion defining a battery receiving groove for receiving a battery, a first sliding groove and a second sliding groove respectively communicating with the battery receiving groove; and
   a battery holding structure assembled to the frame portion, the battery holding structure comprising:
      a first locking member movably received in the first sliding groove and comprising a first latching block;
      a second locking member movably received in the second sliding groove and comprising a second latching block; and
      a spring compressed between the second locking member and an inner surface of the second sliding groove and configured to provide a force to push the second latching block into the battery receiving groove;
   wherein the first and the second latching blocks are capable of being pushed into the battery receiving groove to cooperatively latch the battery in the battery receiving groove, the first and second latching blocks are also capable of being pushed out of the battery receiving groove to release the battery from the battery receiving groove.

2. The computer enclosure of claim 1, wherein the frame portion comprises two side walls, a top wall, and a bottom wall opposite to the top wall, a sub-frame extends from an inner surface of the bottom wall towards the top wall, the sub-frame defines the battery receiving groove.

3. The computer enclosure of claim 2, wherein the battery receiving groove comprises a top surface, two opposite side surfaces, and a front surface interconnecting the top surface to the side surfaces, the side surfaces oppositely extend two strip protrusions, with each strip protrusion substantailly parallel to the front surface, the strip protrusions are configured to hold two opposite sides of the battery.

4. The computer enclosure of claim 2, wherein the frame portion comprises a flange portion extending upwards from a top surface of the sub-frame, the flange portion comprises a first surface facing and spaced from the frame portion, and a second surface opposite to the first surface, the first sliding groove and the second sliding groove are defined in the first surface extending towards the second surface.

5. The computer enclosure of claim 4, wherein a latching hole is defined in each one of an inside surface of the first sliding groove and an inside surface of the second sliding groove, the latching holes of the first sliding groove and the second sliding groove are communicated with the battery receiving groove and each latching hole is configured to allow a corresponding one of the first and second latching blocks to pass through.

6. The computer enclosure of claim 4, wherein the battery holding structure comprises two operation members, one operation member is connected to the first locking member and configured to push the first locking member to slide in the first sliding groove, another operation member is connected to the second locking member and configured to push the second locking member to slide in the second sliding groove.

7. The computer enclosure of claim 6, wherein the second surface defines a third sliding groove communicated with the first sliding groove, and a fourth sliding groove communicated with the second sliding groove, each operation member is received in a corresponding one of the third and fourth sliding grooves.

8. The computer enclosure of claim 7, wherein the flange portion defines a first through hole and a second through hole, the first through hole communicates the first sliding groove with the third sliding groove, the second through hole communicates the second sliding groove with the fourth sliding groove.

9. The computer enclosure of claim 8, wherein the first locking member comprises a first main body and two elastic clamping arms, the first latching block exends from one end of the first main body, the two elastic clamping arms extend from another end of the main body opposite to the first latching block; the flange portion comprises a positioning bar positioned in the first sliding groove along the extending direction of the first sliding groove; the elastic clamping arms clamp on the positioning bar.

10. The computer enclosure of claim 9, wherein the first locking member defines a first locking groove through the first main body; the operation member connected to the first locking member comprises an operation panel, a mounting panel opposite to the operation panel, and two spaced elastic feet portions perpendicularly protruding from the mounting panel, the two spaced elastic feet portions pass through the first through hole and are both received and locked in the first locking groove.

11. The computer enclosure of claim 10, wherein each feet portion has a locking end portion positioned at the distal end thereof.

12. The computer enclosure of claim 10, wherein the operation panel comprises a plurality of rectangular protrusions thereon.

13. The computer enclosure of claim 9, wherein the first main body comprises two opposite first lateral sidewalls, each first lateral sidewall extends two circular first protrusions, the circular first protrusions of the two opposite first lateral sidewalls are movably engaged and locked in the inner side surface of the first sliding groove.

14. The computer enclosure of claim 9, wherein the two elastic clamping arms substantially form a U-shaped configuration and are capable of being elastically stretched away from each other.

15. The computer enclosure of claim 8, wherein the second locking member comprises a second main body and a guiding bar, the second latching block extends from one end of the second main body, the guiding bar extends from another end of the second main body opposite to the second latching block, the spring is a coil spring and coiled around the guiding bar.

16. The computer enclosure of claim 15, wherein the second locking member defines a second locking groove through the second main body; the operation member connected to the second locking member comprises an operation panel, a mounting panel opposite to the operation panel, and two spaced elastic feet portions perpendicularly protruding from the mounting panel, the feet portions pass through the second through hole and are received and latched in the second locking groove.

17. The computer enclosure RZone of claim 15, wherein the second main body comprises two opposite second lateral sidewalls, each second lateral sidewall extends two circular second protrusions, the circular second protrusions of the two opposite second lateral sidewalls are movably engaged and locked in the inner surface of the second sliding groove.

18. The computer enclosure of claim 1, wherein each of the first and second latching blocks is wedge-shaped.

19. The computer enclosure of claim 1, comprising a front cover and a rear cover, wherein the front cover and the rear cover are detachably connected to two opposite sides of the frame portion, the rear cover defines an opening corresponding to the battery receiving groove, the first groove, and the second sliding groove.

* * * * *